March 10, 1936.  G. B. HANSON ET AL  2,033,429
MULTIPLE ELECTRODE TREATER AND METHOD
Filed April 2, 1932  2 Sheets-Sheet 1
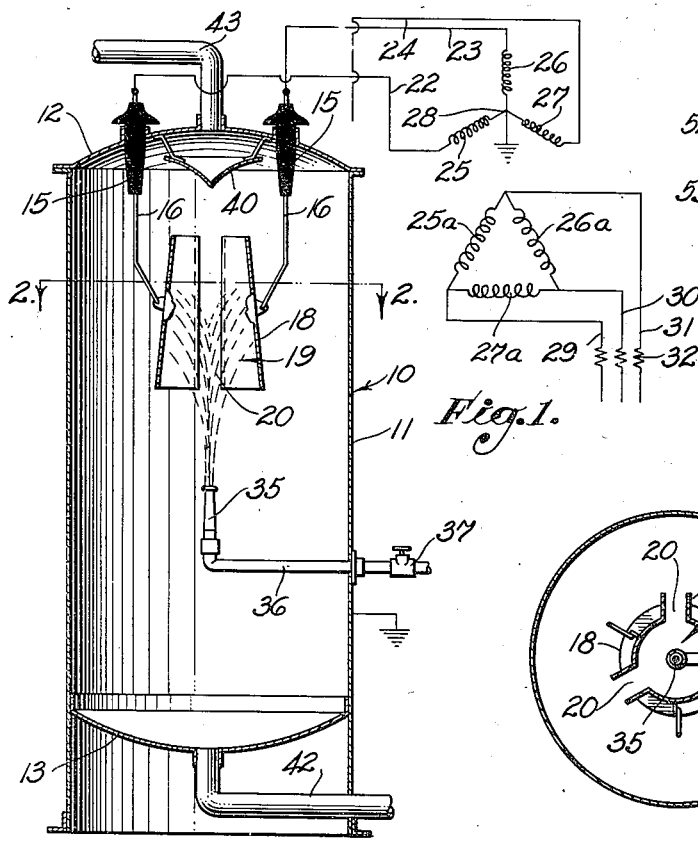
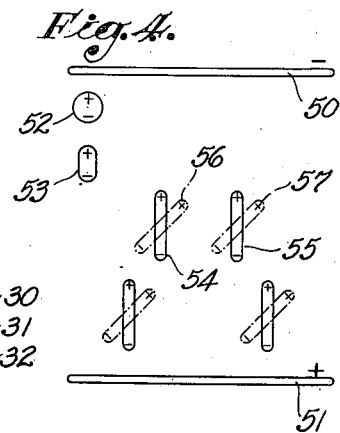
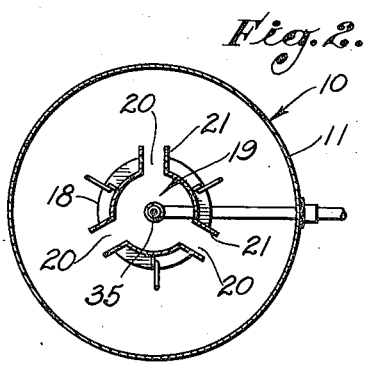
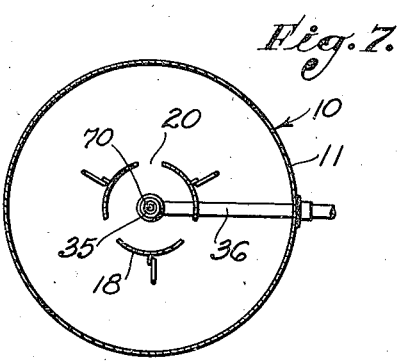
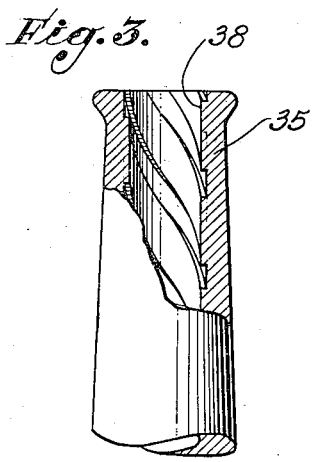
INVENTORS:
Gordon B. Hanson,
Harold C. Eddy,
By
Fred W. Lawrie
ATTORNEY.

March 10, 1936.  G. B. HANSON ET AL  2,033,429
MULTIPLE ELECTRODE TREATER AND METHOD
Filed April 2, 1932  2 Sheets-Sheet 2
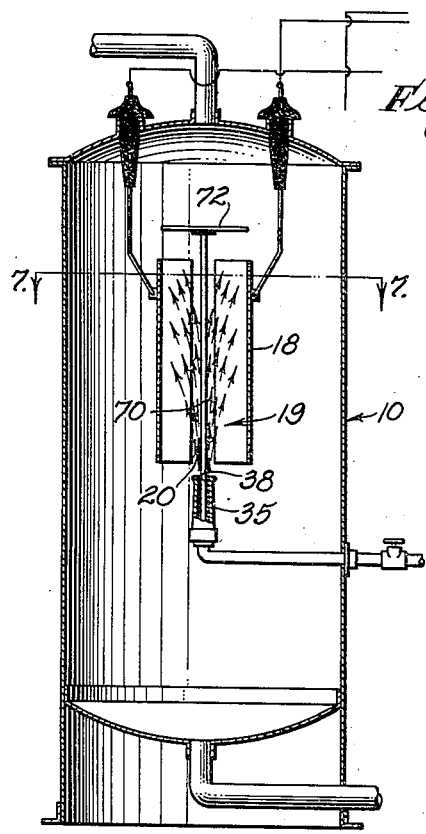
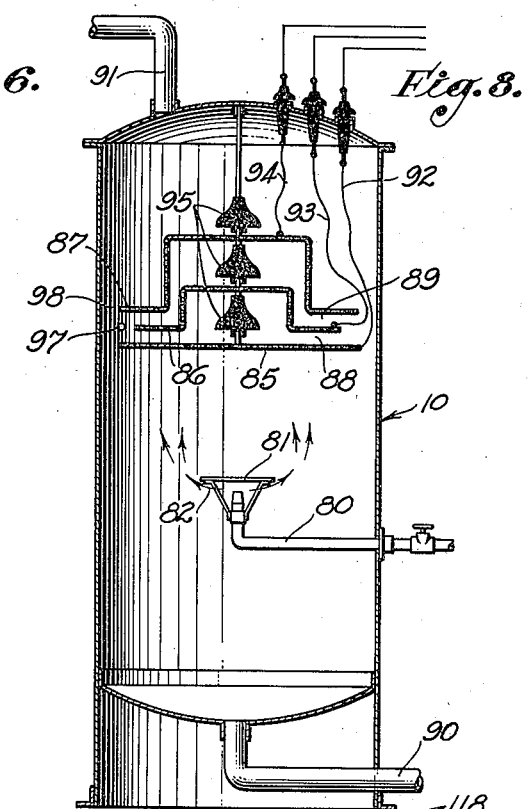
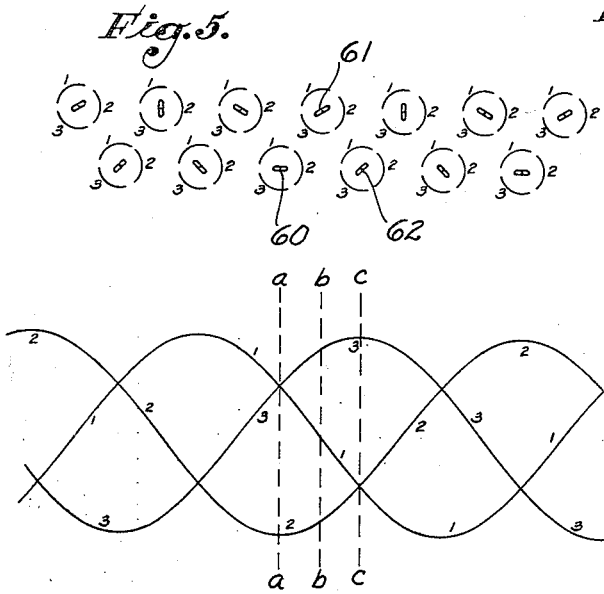
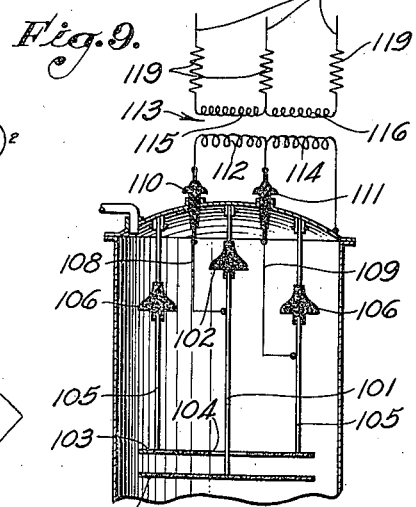
INVENTORS:
Gordon B. Hanson,
Harold C. Eddy.
BY
ATTORNEY.

Patented Mar. 10, 1936

2,033,429

UNITED STATES PATENT OFFICE 2,033,429

MULTIPLE ELECTRODE TREATER AND METHOD

Gordon B. Hanson, Houston, Tex., and Harold C. Eddy, Los Angeles, Calif., assignors to Petroleum Rectifying Company of California, Los Angeles, Calif., a corporation of California Application April 2, 1932, Serial No. 602,746

30 Claims. (Cl. 204—24)

Our invention relates to the art of electrical separation of mixtures, and more particularly to a novel method and apparatus for electrically separating the phases of an emulsion.

It has long been known that a high intensity electric field set up between a pair of electrodes by an alternating potential will act to agglomerate the dispersed droplets or particles of an emulsion positioned therebetween. In the absence of an electric field, each of such dispersed particles tends normally to assume a spherical shape due to the surface tension forces at the interface which tend to make the interfacial area a minimum, this area being a minimum when the particle is in the form of a sphere. However, when an emulsion is subjected to an electric field each particle has induced thereon charges of opposite sign, these charges being concentrated on those portions of the droplet which are closest to the electrodes. These charges on each droplet are attracted toward the electrodes, thus causing an elongation of the particle in a direction toward the electrodes. This action can be readily verified by microscopic observation of an emulsion undergoing treatment.

Such an elongated particle is less stable than a spherical particle, the interfacial surface being stretched or deformed in such a manner that it will be rather easily ruptured so that the particle will agglomerate more or less easily with adjacent particles upon coming in contact therewith. This agglomerating action is, of course, desirable for it is desirable to agglomerate the particles into masses of sufficient size to gravitationally separate.

This tendency for any particle to mechanically contact an adjacent particle is assisted by the presence of induced charges on these particles, for if these charges are of opposite sign they will tend to draw the particles into contact with each other. The electrical charges on the particles thus themselves exert a force tending to coalesce the particles. It will be understood that the magnitude of the charge thus induced on a particle in an electric field increases as the particle elongates, for as the length of the particle increases, this particle extends over a greater proportion of the distance between the electrodes.

It will further be clear that the sign of the charge at either end of such a particle changes each time the high potential supplied to the electrodes alternates. However, as the change in sign at both ends of the particle occurs simultaneously, the particle remains elongated.

We have found it desirable to set up an action tending to elongate this particle first in one direction and then in another. This directly assists the agglomeration in two respects; first, it increases the stresses set up in the particle itself, and, second, the particles in themselves elongate in various directions and thus tend to mechanically contact many more particles than would be the case if the particle were elongated in but one direction. This results, of course, in quicker agglomeration of the particles due both to the greater chance of mechanical contact and to the fact that the internal rupturing strains are correspondingly increased.

It is an object of the present invention to provide a system wherein there is a tendency for such an emulsion particle to be elongated successively in different directions.

A three-phase alternating potential has been found to give a very desirable treating action. With such a system an emulsion particle can be subjected to the resultant field formed between electrodes connected to a three-phase source of alternating potential, the result being a tendency for the particle to elongate in different directions to set up the desirable action previously described.

It is an object of the invention to provide a system of treating wherein an emulsion particle is subjected to the resultant action of electric fields set up by a multi-phase potential.

In its preferred form the invention utilizes a balanced three-phase system, the utilization of such a system being another object of the invention.

If such a field is established by the use of three mutually adjacent electrodes, it becomes possible not only to subject the emulsion to the resultant field therebetween, but to force at least a portion of this emulsion through the intense field between the edges of the adjacent electrodes, and it is an object of our invention to provide such a method and apparatus.

It is a further object of the invention to provide a segmental electrode structure for defining a treating space.

It is another object of the invention to provide an outer or surrounding electrode structure and to flow the emulsion to be treated so that it moves outward from the central axis of this electrode structure and toward this structure.

The emulsion constituents thus spreading from the central axis may move entirely through the electrode structure if suitable interstices are provided, and the provision of such a system is included among the objects of this invention.

It is a further object of the invention to increase the tendency for the emulsion to move outward through the electrode structure by the use of a suitable diverging-stream nozzle or by use of a deflecting means.

The internal stresses in an emulsion particle can be increased still further if the incoming emulsion is made to rotate. This sets an emulsion particle itself into rotation, and if this direction of rotation is counter to the direction of the apparent rotation of an electric field in which it is positioned the result is that the particle tends to be rotated with respect to the electrodes so that the electrodes must continuously change the position of the charges on the particle surface. The result of these two actions is somewhat analogous to the increase of the applied frequency, in so far as the increase in internal stress is concerned.

It is another object of the invention to rotate the incoming emulsion. Such a rotation not only sets up a desirable action in conjunction with a multi-phase electric field, but also acts in itself to move the emulsion centrifugally from the treating space through the interstices of the surrounding or outer electrode structure.

A further object of the invention lies in the utilization of a rifled nozzle for thus setting up a rotation of the incoming emulsion.

Further objects of the invention lie in other features of the apparatus to be hereinafter shown and described, while still other objects of the invention will be evident to those skilled in the art from the following description.

Referring to the drawings,—

Fig. 1 is a vertical sectional view of one form of the treater.

Fig. 2 is a sectional view taken on the line 2—2 of Fig. 1.

Fig. 3 is an enlarged view of the rifled nozzle of the invention.

Fig. 4 is a diagram illustrating the action which takes place between a pair of charged electrodes when an emulsion is positioned therebetween.

Fig. 5 is a graphical representation of the action of the three-phase potential utilized.

Fig. 6 is a sectional view of another form of the invention.

Fig. 7 is a sectional view taken on the line 7—7 of Fig. 6.

Figs. 8 and 9 are sectional views of other forms of the invention.

Referring particularly to Fig. 1 we have illustrated a tank 10 including a shell 11 respectively closed at its upper and lower ends by upper and lower heads 12 and 13.

Three insulators 15 are mounted in the upper head 12 and retain conductors 16 which extend therethrough. To the lower end of each of these conductors is connected an electrode 18, these electrodes being spaced from the vertical axis of the tank so as to surround a treating space 19, best shown in Figs. 1 and 2, and defining an interstitial electrode structure.

In this form of the invention three electrodes 18 are utilized, each electrode being frusto-conical in shape so that together they define a treating space 19 which is smaller at its upper end than at its lower end. Adjacent electrodes 18 are mounted so that their edges are spaced from each other to define auxiliary treating spaces 20. In this embodiment of the invention, the edges of each electrode provide outwardly extending flanges 21 which cooperate with similar flanges of the adjacent electrode to provide relatively extensive auxiliary treating spaces 20.

The upper ends of the conductors 16 are respectively connected by wires 22, 23, and 24 to three windings 25, 26, and 27 of a high-potential multi-phase source. In the preferred embodiment of the invention this source is in the form of a transformer having three primary and three secondary windings, the secondary windings corresponding to the windings 25, 26, and 27. It is entirely possible, however, to utilize a plurality of separate transformers as a potential-supply source. It has been found desirable, however, to connect the windings 25, 26, and 27 in Y, the neutral point 28 being connected to the tank 10 through ground. The primary windings corresponding to the windings 25, 26, and 27 may also be connected in Y, but are preferably connected in delta as shown in Fig. 1, these windings being respectively indicated by the numerals 25a, 26a, and 27a, the terminals of the delta being supplied by a three-phase supply line providing conductors 29, 30, and 31 each of which contains a choke coil 32.

The emulsion may be introduced into the treating space 19 by any suitable means, but we prefer to utilize an upwardly directed diverging-stream nozzle 35 in alignment with the axis of the treating space 19 and communicating with a supply pipe 36 including a valve 37. The nozzle 35 provides an orifice 38, best shown in Fig. 3, and through which the emulsion moves. To secure such a diverging stream the preferred embodiment utilizes an orifice which is rifled as indicated in Fig. 3 so that the emulsion moving upward into the treating space 19 is rotated. Other means may be utilized for effecting this rotation such, for instance, as helical vanes positioned in the orifice 38. Such a rotation of the emulsion in this space sets up centrifugal forces which assist in moving portions of the emulsion from the treating space 19 through the auxiliary treating spaces 20 rather than from the upper end of this treating space 19. In this respect it is desirable to move a material portion of the emulsion through these auxiliary treating spaces 20, and this can be partially or wholly effected by the rifling of the nozzle 35. It is preferable, however, to make the treating space 19 conical, as shown, so that the upper end of this treating space is more restricted than the lower end. The result is that the upwardly moving emulsion is throttled and at least a portion thereof moves outward through the auxiliary treating spaces 20.

If it is desired to further increase the amount of the emulsion moving outward through the auxiliary treating spaces 20, this may be done by positioning a deflecting means in the path of flow of the emulsion, such a means being disclosed in Fig. 1 as comprising a pointed deflector 40 suspended from the upper head 12, the point of this deflector being downward and in alignment with the axis of the treating space 19. The deflecting action can be increased by lowering the deflector 40 with respect to the electrodes 18 so that any desired quantity of the emulsion can be forced outward through the auxiliary treating spaces 20 instead of moving upward from the upper end of the treating space 19.

Two methods of operation are possible. Either the constituents of the emulsion may be separated in the tank 10, the heavier constituent being withdrawn through a pipe 42 and the lighter constituent being drawn through a pipe 43, or the emulsion may be withdrawn from the tank 10 prior to the time that complete separation takes place. In either event it is desirable to first fill the tank 10 with di-electric oil prior to the time that emulsion is forced through the pipe 36.

The desirable treating action effected in this apparatus can best be understood by reference to Figs. 4 and 5. In Fig. 4 we have diagrammatically shown the relative position of two electrodes 50 and 51, the space between these electrodes being filled with an emulsion containing dispersed particles, usually water. If no potential is impressed across the electrodes 50 and 51, these particles will assume a spherical shape for reasons previously set forth. Such a spherical particle, greatly enlarged, is indicated in the upper left-hand portion of Fig. 4 by the numeral 52, and it will be clear that if no potential difference is impressed between the electrodes 50 and 51 there will be no induced charges on the particle 52. If, however, the electrode 51 is made positive and the electrode 50 is made negative, a charge will be induced on the particle 52 due to its being positioned in the field. That portion of the particle which is closest the electrode 50 will be charged positively, while that portion of the particle closest to the electrode 51 will be charged negatively. Corresponding signs are indicated on the particle 52. When the charges are thus induced it will be clear that there is a tendency for these charges to separate due to the fact that they are mutually attracted to the electrodes 50 and 51. This causes an elongation of the droplet along a line joining the two electrodes and passing through the center of the particle, such an elongated particle is shown, for instance, in Fig. 4 by the numeral 53.

The magnitude of the charges induced on such a particle in an electric field is dependent upon the distance across the particle in a direction across the electric field. As the particle elongates into the form indicated by the numeral 53, the particle extends a greater distance across the field with the net result that the charges induced thereon are correspondingly increased in magnitude. Elongation of the particle beyond a certain point is prevented by the surface tension forces at the interface.

It will also be clear that if the potentials of the electrodes 51 and 50 are suddenly reversed, the charges on the particle will also reverse. This reversal of charges will not, however, effect the elongation, though it may set up rather minute electric currents in the particle itself.

In the lower portion of Fig. 4 we have shown in full lines four of such elongated particles, greatly distorted, two of these particles being indicated by the numerals 54 and 55, the charges shown thereon being those induced when the electrode 51 is positive and the electrode 50 is negative. It now it is possible to turn these particles in the field, or elongate these particles in different directions, it is at once apparent that the elongation not only tends to move each elongated particle into contact with adjacent particles aligned therewith, but in addition will tend to cause contact with adjacent elongated particles. Thus, if the particles 54 and 55 are moved into their dotted-line positions shown by the numerals 56 and 57, either by actual rotation of the elongated particle or by an elongation of the material forming the particle in the direction shown, it will be clear that the elongated particle will thus tend to contact other particles lying to one side thereof, which particles would not be mechanically contacted if all particles remained elongated as shown in full lines of Fig. 4. In addition, it will be clear that the positive charge on the elongated particles shown by the dotted lines 56 will now be attracted to a greater degree to the negative charge on the particle positioned as shown by the dotted line 57. This attraction will also tend to cause agglomeration. It would thus be very desirable to be able to thus actually turn the elongated particles or elongate these particles in different directions.

By the use of a multi-phase system there is a tendency for the particles to be elongated in different directions. This action may best be understood by a reference to Fig. 5. In the lower portion of this figure is shown three sign waves superimposed on each other and 120° out of phase with each other. This condition represents the usual potentials present in a three-phase supply circuit. Curve No. 1 graphically represents the potential supplied to one of the electrodes 18, while curves 2 and 3 graphically represent the potential supplied to the other two of these electrodes. In the upper portion of Fig. 5 we have shown a series of electrode structures, each providing three electrodes numbered to correspond to the curves shown in the lower portion of this figure, these electrodes being circularly disposed similar to the electrode system in Fig. 1. In the center of each electrode system is shown an emulsion particle elongated in a direction controlled by the electric fields established by the three phases at a given instant of time.

The direction of elongation at a given instant depends on the relative intensities of the fields produced by the potentials at such instant. Selecting any instant of time on the curves in the lower portion of Fig. 5, the direction of particle elongation is diagrammatically shown by the electrode system immediately thereabove. Thus, at an instant of time represented by the line a—a, both the electrodes 1 and 3 are energized positively, while the electrode 2 is energized negatively. The result is that the particle will assume a position shown by the numeral 60. At an instant of time 30 electrical degrees later, as presented by the line b—b, the electrode 1 will not be charged, the electrode 3 being charged positively and the electrode 2 being charged negatively. The result is that the particle tends to elongate in a direction indicated by the numeral 61 so as to extend along the line connecting the electrodes 2 and 3. Similarly, at an instant of time 60 electrical degrees from the instant a—a, and as represented by the line c—c, the electrodes 1 and 2 are both charged negatively, while the electrode 3 is charged positively, thus tending to move the particle into a position shown by the line 62. It will thus be apparent that at different instants of time there is present different tendencies to deform or elongate the particle, thus resulting in the desirable action hereinbefore set forth. Such a multi-phase alternating potential sets up a resultant rotating electric field closely analogous to the well-known rotating magnetic field of a multi-phase induction motor except that in one instance the field is essentially electrostatic and in the other instance it is electromagnetic in character.

In the form of the invention shown in Fig. 1 it will be clear that the potential between any two of the electrodes 18 is greater than the potential between either of these electrodes and the tank 10. This is a desirable factor in view of the insulator economy thus effected. In addition, this is an important factor because it tends to prevent low resistance chains forming between the electrodes 18 and the tank. Due to the three-phase relationship, the effective voltage between adjacent electrodes 18 is 1.73 times as high as the potential between any of these electrodes and the tank.

It will be further apparent that if the incoming emulsion contains a large proportion of conducting material, this conducting material itself will remain at ground potential even after it first enters the treating space 19 for the stream itself is conducting and thus electrically connected to the nozzle 35. This is especially true if the orifice 38 is not rifled, in which case the stream will not rotate but will move into the treating space 19. In this event a treating action takes place between the stream and the electrodes 18, and it will be clear that the potential setting up this treating action is equal to the potential of any one phase, and is thus less than the potential between any two electrodes 18. In other words, this potential is equal to the potential between one of the electrodes 18 and ground. This sets up a preliminary treating action at a relatively lower potential than that potential to which the emulsion is subjected as it moves through the auxiliary treating spaces 20. It is not, however, necessary to use such an emulsion, for if a relatively non-conducting emulsion is forced through the nozzle 35 it will be acted upon by the three-phase field as previously described.

Another form of treater is shown in Fig. 6. In this treater a rod 70 extends into the orifice 38 of the nozzle 35 and through the treating space 19. As this rod is electrically connected to the tank 10 it follows that the potential between the rod and any of the electrodes 18 is equal to the potential above ground developed by the windings 25, 26, or 27 connected thereto. An emulsion particle which lies immediately to one side of the rod 70 is thus treated mainly by the field which is set up adjacent this side of the rod. If, however, the emulsion particle is in the outer portion of the field, there is a tendency for the particle to be acted upon by the resultant field produced by all three of the electrodes so that there is a tendency for the particle to elongate in different directions as previously set forth. As the particle moves through the auxiliary treating spaces 20 between the electrodes 18, it is subjected to a potential which is 1.73 times as high as the potential between the rod 70 and any of the electrodes 18, thus giving the desirable high intensity treatment.

The electrodes 18 of the electrode structure shown in Fig. 6 are of slightly different form from those shown in Fig. 1 in that they are cylindrical segments and do not provide the outward extending flanges. Instead, the auxiliary treating spaces are defined by the edges of the cylindrical segments themselves, as best shown in Fig. 7. This electrode structure provides a cylindrical treating space 19 rather than a tapered one, as shown in Fig. 1.

With the form of the invention shown in Fig. 6 the deflecting means 40 shown in Fig. 1 may be utilized, but we prefer to utilize a deflecting means including a disc 72 secured to the upper end of the rod 70 and extending at least partially across the upper end of the treating space 19 so as to throttle the upward flow of the emulsion and move this emulsion outward through the auxiliary treating spaces. Further, this outward movement of the emulsion can be increased by utilizing a diverging-stream nozzle. As above mentioned, this can be accomplished by rifling the orifice 38 of the nozzle 35, and thus throwing the emulsion outward through centrifugal force.

In Fig. 8 we have shown still another form of the invention in which the emulsion is introduced upward through a pipe 80. A baffle 81 spreads the incoming emulsion as indicated by arrows 82, this emulsion moving upward in the tank 10 and through a lower screen electrode 85, which may be conveniently made in the form of a disc. Disposed successively above the lower screen electrode 85 are electrodes 86 and 87 respectively designated as intermediate the upper electrodes, these electrodes being preferably made of screen. Each of these electrodes provides disc portions which cooperate in defining a lower treating space 88 and an upper treating space 89. The emulsion successively flows into these treating spaces, and the heavier phase thereof is therein agglomerated and drops downward into the tank to be withdrawn through a pipe 90, the dry oil rising and flowing from the tank through a pipe 91.

The electrodes 85, 86, and 87 are respectively energized from a three-phase source, not shown, the current being conducted to these electrodes by any suitable means. In the form shown in Fig. 8 this means is diagrammatically illustrated as comprising three insulators through which conductors 92, 93, and 94 extend, these conductors being respectively connected to the electrodes 85, 86, and 87; this showing is, however, only diagrammatic. Similarly, the means for mounting the electrodes 85, 86, and 87 is only diagrammatically shown in Fig. 8 as comprising insulators 95. Other insulating structures may be utilized.

As the emulsion moves upward into the lower treating space 88 it comes under the influence of an electric field set up by one of the three phases, and any of the emulsion which moves upward through the intermediate electrode 86 and into the upper treating space 89 is subjected to the field set up by another of these phases. It is preferable to make the disc of the intermediate electrode 86 of somewhat smaller diameter than the outer diameter of the lower and upper electrodes 85 and 87 so that an emulsion particle in a position indicated by the numeral 97 will be acted upon by the resultant action of the three fields in a manner previously described with reference to Fig. 1.

The outer edges of the electrodes 85, 86, and 87 cooperate with the inner wall of the tank 10 in providing outer treating spaces 98, and any of the emulsion which moves upward through these spaces is subjected to an electric field corresponding in potential to the potential of one of the phases. This potential is, of course, lower than the potential between the electrode 86 and either of the electrodes 85 or 87, as previously set forth. Thus, the particle 97 is subjected not only to a high intensity field set up between the electrodes 85 and 87, but in addition is subjected to a lower intensity field between the edge of the electrode 86 and the tank, the voltage across the former field being 1.73 times as high as the voltage across the latter field.

In the form of the invention shown in Fig. 9 only two electrodes are utilized but are connected to a three-phase supply system. The lower of these electrodes is indicated by the numeral 100 and is preferably formed of screen or other interstitial material. It is suspended by a rod 101 mounted in the tank on an insulator 102. An upper electrode 103 may also be made of interstitial material and provides a central opening 104 through which the rod 101 passes. Rods 105 and insulators 106 support this upper electrode.

Conductors 108 and 109 respectively supply current to the rods 101 and 105 and extend through insulators 110 and 111 to connect to the terminals of a secondary winding 112 of a transformer system 113. This transformer system also includes a secondary winding 114 connected to the conductor 112 and to the tank of the treater. Primary windings 115 and 116 induce current in the windings 112 and 114 and are connected to two phases of a three-phase supply line 118, each conductor of which includes a choke coil 119 or other current limiting means. The voltage between the electrodes 100 and 103 is thus equal to the potential developed by the winding 112 while the potential between the electrode 103 and the tank is equal to the potential developed by the winding 114. The potential between the electrode 100 and the tank is equal to the vectorial sum of the potentials developed by the windings 112 and 114.

In any of the forms of the invention herein shown it is clear that any tendency for any one of the electrodes to short-circuit is reflected in all of the primary windings of the transformer. Thus, the current supplied through the conductors of the supply line are not greatly unbalanced if short-circuit of one of the electrodes should take place. Further, even if one of these electrodes did short-circuit it will be clear that the remaining electrodes will still be energized and will tend to clear up the short-circuiting condition. We have found it very desirable to utilize the chokes 32 in each of the supply conductors to limit the current supplied to the transformer. These chokes have the additional desirable feature of reducing the voltage supplied through any conductor which carries excessive current, thus tending to further balance the current in the phases as far as the supply line is concerned.

It should be understood, however, that we are not in all instances limited to a three-phase supply system for other multi-phase systems may be utilized to secure the desirable results herein set forth. The availability of a three phase supply and the advisability of maintaining a balanced load make this system most feasible as far as commercial installations are concerned, but other systems may be utilized, through they usually require the installation of extra equipment. If the apparatus is used in conjunction with a multi-phase alternating generator, the electrode segments may conveniently be made equal to the number of poles on the generator.

It will be further clear that certain of the features herein disclosed are of advantage whether or not a multi-phase supply system is utilized. Thus, the electrode structures and the rifled nozzle have utility in other installations, as does also the deflecting means.

This application is subordinate to the application of Louis E. McDonald, entitled Multiple electrode treater and method, Serial No. 602,745, filed April 2, 1932, which contains dominating claims on multi-phase treatment.

We claim as our invention:

1. A method of treating a petroleum emulsion by the use of a three-phase alternating potential, which includes the steps of: utilizing said three-phase alternating potential to establish a three-phase resultant electric field the character of which at any instant is determined by the vectorial relationship of the potentials of the three phases at this instant; and subjecting the emulsion to be treated to this resultant field whereby the dispersed particles in said emulsion are acted upon by a field controlled by the instantaneous relationships of said three phases.

2. In an electric treater for treating an emulsion positioned in a treating space, the combination of: three electrodes disposed around and bounding said treating space in which is positioned said emulsion; a three-phase potential-supply means providing three windings; means for connecting each of said windings to one of said electrodes to set up a resultant field in said treating space which varies in response to changes in potential of each of said phases, said resultant field coalescing the dispersed phase of said emulsion into masses of sufficient size to gravitate from the balance of the emulsion constitutents; means for introducing emulsion into said treating space; and means for separating said coalesced phase from the remaining phase-liquid of said emulsion.

3. In an electric treater, the combination of: a segmental electrode structure surrounding a treating space and comprising a plurality of electrodes insulated from each other and positioned around the axis of said treating space with edges adjacent each other to define auxiliary treating spaces; and means for introducing the emulsion into said treating space, at least a portion of said emulsion flowing outward through said auxiliary treating spaces.

4. A combination as defined in claim 3 in which said last-named means comprises a nozzle directing a stream of said emulsion axially into one end of said treating space, and including deflecting means at the other end of said treating space for impeding the passage of said emulsion from said other end of said treating space and thus acting to move said emulsion from said treating space through said auxiliary treating spaces.

5. A combination as defined in claim 3 in which said electrodes are closer to each other at the end from which said emulsion tends to flow whereby a portion of said emulsion is forced outward through said auxiliary treating spaces.

6. A combination as defined in claim 3 in which said electrodes are in the form of frusto-conical segments to define a tapered treating space, and in which said emulsion is introduced into the larger end of said treating space.

7. In an electric treater, the combination of: a segmental electrode structure comprising a plurality of arcuate electrode plates with outward extending flanges on opposite edges thereof;

mounting means for mounting said arcuate electrode plates around an axis to define a treating space, the outward extending flanges of adjacent arcuate electrode plates thus defining auxiliary treating spaces, said mounting means insulating said electrode plates one from the other whereby an electric field can be established in both said treating space and in said auxiliary treating spaces; and means for introducing emulsion into said treating space, a portion of said emulsion moving outward through said auxiliary treating spaces.

8. In combination in an electric treater; electrodes spaced from an axis to define a treating space; a nozzle directed into said treating space along said axis, said nozzle providing a rifled passage which discharges a rotating stream of emulsion into said treating space, the centrifugal force acting on the particles of said emulsion tending to throw said emulsion outward from said treating space through the spaces between the edges of said electrodes.

9. A combination as defined in claim 8 including means for impressing potentials across said electrodes in such sequence as to elongate an emulsion particle in said treating space in different directions at successive instants, the rotation of the incoming emulsion thus turning the particle out of the position it would assume under the influence of the electric field.

10. A method of coalescing the dispersed phase of an emulsion, which method includes the steps of: establishing a rotating electric field by the use of the mutual action of all of the phases of a multi-phase alternating potential of at least three phases; and subjecting the emulsion to be treated to said rotating electric field whereby the dispersed droplets of said emulsion are coalesced by said field into larger masses.

11. A method of treating an emulsion including a continuous phase and a dispersed phase comprising suspended droplets, which method includes the steps of: establishing a rotating electric field in said emulsion by the use of a multi-phase alternating potential whereby each of said droplets tends to be successively elongated in different directions at successive instants of time; and moving said emulsion to turn said droplets out of the position they would assume under the influence of said electric field.

12. A method of treating an emulsion by the use of a multi-phase alternating potential, which method includes the steps of: building up a resultant electric field in said treating space varying in response to the undulations of each of the phases of said multi-phase alternating potential; building up an auxiliary electric field varying in response to the vectorial sum of the potentials of two of said phases; and successively subjecting emulsion to the action of said fields.

13. A method of treating an emulsion by the use of a three-phase alternating potential, which method includes the steps of: building up a resultant electric field in said treating space varying in response to the undulations of each of the phases of said three-phase alternating potential; building up another electric field adjacent said resultant electric field and varying in response to the alternating potential in one of said phases and subjecting emulsion to the action of said fields.

14. A method of treating an emulsion by the use of a multi-phase alternating potential, which method includes the steps of: building up a resultant electric field in said treating space varying in response to the undulations of each of the phases of said multi-phase alternating potential; building up an auxiliary electric field varying in response to the vectorial sum of the potentials of two of said phases; building up another electric field adjacent said resultant electric field and varying in response to the alternating potential in one of said phases; and subjecting emulsion to the action of said fields.

15. In an electric treater for emulsions, the combination of: an interstitial electrode structure surrounding and defining a treating space; a nozzle directing a stream of emulsion axially into said treating space; and deflector means in the path of flow of said stream of emulsion to deflect said stream outwardly through the interstices of said electrode structure.

16. In an electric treater for emulsions, the combination of: an interstitial electrode structure surrounding and defining a treating space; a nozzle directed axially into said treating space and providing an orifice; means in said orifice for imparting a rotary movement to a liquid flowing therethrough; means for establishing an electric field adjacent said interstitial electrode structure; and means for delivering emulsion to said nozzle, the means in said orifice rotating the stream of emulsion flowing into said treating space whereby the centrifugal force acting on the emulsion tends to force this emulsion outward in said treating space and through the interstices thereof.

17. In an electric treater for emulsions, the combination of: a plurality of live electrodes grouped around a common axis and mutually cooperating in defining a treating space through which said axis extends; means for insulating said electrodes from each other; supply means for impressing a potential difference between said live electrodes to set up a resultant electric field in said treating space, the character of said resultant field at any instant being determined by the potentials impressed on said live electrodes at this instant; and grounded means for introducing emulsion into said treating space whereby an electric field is also set up by said supply means between said grounded means and each of said live electrodes.

18. In an electric treater, the combination of: three live electrodes disposed around and defining a treating space containing an emulsion; a three-phase supply means including a plurality of Y-connected windings, each winding being connected to one of said electrodes to set up a resultant electric field in said treating space varying in response to changes of potential in each of said phases and of sufficient intensity to coalesce the dispersed phase of the emulsion in said treating space into masses of larger size; an emulsion introduction means for introducing emulsion into said treating space; and means electrically connecting said emulsion introduction means to the common terminals of said Y-connected windings whereby a field is established between said emulsion introduction means and each of said live electrodes.

19. In an electric treater for emulsions, the combination of: electrode means surrounding and defining a space open at its ends; a rod disposed axially in said space and cooperating with said electrode means in defining a treating space; means for insulating said rod from said electrode means; nozzle means directing a stream of emulsion axially into said treating space in the form of an envelope of emulsion around said rod and flowing therealong; and means for moving said envelope of emulsion outward away from said rod and toward said electrode means before said emulsion leaves said treating space, said means including a deflector means on said rod and extending in the path of said emulsion envelope.

20. In an electric treater for emulsions, the combination of: a metallic tank; three live electrodes in said tank and insulated therefrom and disposed around and defining a treating space containing the emulsion to be treated; a multi-phase supply means including three Y-connected phases with a neutral; means for connecting said tank to said neutral; means connecting each of said phases to one of said electrodes to set up a resultant electric field in said treating space varying in response to changes of potential in each of said phases and of sufficient intensity to coalesce the dispersed phase of said emulsion.

21. In an electric treater for emulsions, the combination of: a plurality of live electrodes disposed around and defining a treating space containing the emulsion to be treated; a central electrode centrally disposed with respect to said electrodes; means for insulating said live electrodes from each other and from said central electrode; a multi-phase supply source including a plurality of phase windings and a neutral point electrically common to said phase windings; means for connecting each of said phase windings to one of said electrodes; and means for connecting said neutral point to said central electrode whereby electric fields are established between said electrodes of sufficient intensity to coalesce the dispersed phase of said emulsion.

22. In an electric treater for emulsions, the combination of: an electrode structure defining a treating space; means for establishing an electric field in said treating space of sufficient intensity to coalesce the dispersed phase of the emulsion to be treated; and a nozzle directing a stream of emulsion into said treating space and providing means therein for rotating the emulsion moving therethrough whereby said nozzle discharges a rotating stream of said emulsion, the centrifugal force acting on the particles of said emulsion acting to throw said emulsion outward in said treating space toward said electrode structure.

23. In an electric treater for emulsions, the combination of: an electrode structure defining a treating space disposed about an axis; means for establishing an electric field in said treating space of sufficient intensity to coalesce the dispersed phase of the emulsion to be treated; a nozzle directing a stream of emulsion into said treating space along said axis and providing a passage; a deflector means in the path of flow of said stream of emulsion to deflect said stream outwardly in said treating space toward said electrode structure; and means in said passage of said nozzle for rotating said stream of emulsion whereby the centrifugal action on the emulsion in said rotating stream assists the action of said deflector means in moving said emulsion outward toward said electrode structure.

24. In combination in an electric treater for emulsions: a sleeve electrode structure; a rod electrode extending into said sleeve electrode structure and cooperating therewith in defining a treating space in which is established an electric field; and a diverging-stream nozzle into which said rod electrode extends, said nozzle and said rod cooperating in producing a diverging annular stream of emulsion which spreads toward said sleeve electrode structure immediately upon being expelled from said nozzle, said stream diverging in sufficient degree to move emulsion particles across said treating space and into contact with said sleeve electrode structure.

25. A method of electrically treating an emulsion by the use of an outer electrode structure positioned in a tank and surrounded by emulsion constituents in said tank and being open at its ends to communicate with said emulsion constituents at each end thereof, said outer electrode structure bounding a treating space, which method includes the steps of: establishing an electric field in said outer electrode structure; introducing into a central portion of said outer electrode structure and in a direction along the central axis thereof and in spaced relation with said outer electrode structure a diverging stream of emulsion which stream thus enters the central portion of said outer electrode structure, said stream spreading in sufficient degree to move emulsion particles into a position adjacent said outer electrode structure; and moving at least a portion of the treated emulsion from that end of said outer electrode structure toward which said stream of emulsion moves within said electrode structure.

26. A method of electrically treating an emulsion by the use of an outer electrode structure open at its ends, which method includes the steps of: establishing an electric field in said outer electrode structure; introducing into a central portion of said outer electrode structure at one end thereof and in a direction along the central axis thereof and in spaced relation with said outer electrode structure a diverging stream of emulsion which stream spreads from said central axis in sufficient degree to move emulsion particles through said outer electrode structure whereby a portion of the emulsion constituents is removed sidewise from said field through said outer electrode structure; and removing the remaining emulsion constituents from the open end of said outer electrode structure opposite said one end into which the emulsion is introduced.

27. A method of electrically treating an emulsion by the use of an outer electrode structure positioned in a tank and surrounded by emulsion constituents in said tank and being open at its ends to communicate with said emulsion constituents at each end thereof, which method includes the steps of: establishing an electric field in said outer electrode structure; flowing axially into one end of said outer electrode structure and in spaced relation with said outer electrode structure a stream of emulsion which tends to flow through said outer electrode structure and from the other end thereof without spreading sufficiently to contact said outer electrode structure; spreading said stream of emulsion moving in said outer electrode structure in sufficient degree to move emulsion particles from the normal path of said stream into a position contacting said outer electrode structure; and moving at least a portion of the treated emulsion from that end of said outer electrode structure toward which said stream of emulsion moves within said electrode structure.

28. In combination in an electric treater for emulsions: an outer electrode structure; means for establishing an electric field in said outer electrode structure; and a diverging-stream nozzle discharging centrally into said outer electrode structure a diverging stream of emulsion which spreads as soon as it is discharged from said nozzle, said stream of emulsion spreading toward said outer electrode structure in sufficient degree to contact same while in said electric field.

29. A method of electrically treating an emulsion by use of an outer electrode structure positioned in a tank and surrounded by emulsion constituents in said tank, and being open at its ends to communicate with said emulsion constituents at each end thereof and a small inner electrode centrally disposed in said outer electrode structure and cooperating therewith in defining an annular treating space, which method includes the steps of: establishing an electric field in said annular treating space which field is more concentrated adjacent said inner electrode than adjacent said outer electrode due to the concentric nature of said electrode structures; introducing into said field in spaced relation with said outer electrode structure a diverging stream of emulsion coaxially with said central electrode which stream spreads from the axis of said outer electrode structure, the spreading of said stream being sufficient to move emulsion across said treating space and into contact with said outer electrode structure while said emulsion is in said electric field; and moving at least a portion of the treated emulsion from that end of said outer electrode structure toward which said stream of emulsion moves within said electrode structure.

30. A method of electrically treating an emulsion by use of an outer electrode structure and a small inner electrode centrally disposed in said outer electrode structure and cooperating therewith in defining an anuular treating space, which method includes the steps of: establishing an electric field in said annular treating space which field is more concentrated adjacent said inner electrode than adjacent said outer electrode due to the concentric nature of said electrode structures; introducing into said field in spaced relation with said outer electrode structure a diverging stream of emulsion coaxially with said central electrode which stream spreads from the axis of said outer electrode structure, the spreading of said stream being sufficient to move emulsion across said treating space and into contact with said outer electrode structure while said emulsion is in said electric field; moving at least a portion of the spreading emulsion outward from said field through said outer electrode structure; and establishing a secondary electric field around said outer electrode structure and into which flows for further treatment the emulsion moving outward through said outer electrode.

GORDON B. HANSON.
HAROLD C. EDDY.